US006947901B1

(12) United States Patent
McCabe et al.

(10) Patent No.: US 6,947,901 B1
(45) Date of Patent: Sep. 20, 2005

(54) DERIVATIVE SECURITIES TRADING PRODUCT UTILIZING SUBSETS OF INDICES OR PORTFOLIOS

(75) Inventors: Daniel J. McCabe, Valley Cottage, NY (US); John A. Mulheren, Rumson, NJ (US)

(73) Assignee: Hunter IP LLC, New York, NY (US)

( * ) Notice: Subject to any disclaimer, the term of this patent is extended or adjusted under 35 U.S.C. 154(b) by 0 days.

(21) Appl. No.: 09/559,320

(22) Filed: Apr. 27, 2000

(51) Int. Cl.[7] .............................................. G06F 17/60
(52) U.S. Cl. ........................... 705/26; 705/35; 364/408
(58) Field of Search .................................... 705/36, 35

(56) References Cited

U.S. PATENT DOCUMENTS 5,806,048 A 9/1998 Kiron et al. .................. 705/35
5,873,071 A * 2/1999 Ferstenberg et al. .......... 705/37
5,946,667 A 8/1999 Tull, Jr. et al. ............... 705/36
5,950,176 A 9/1999 Keiser et al. ................. 705/37
5,978,778 A * 11/1999 O—Shaughnessy ......... 705/36
5,983,204 A 11/1999 Debe ........................... 705/36
6,035,287 A 3/2000 Stallaert et al. ............... 705/37

OTHER PUBLICATIONS

About Selector sector SPDRs (www.spdrindex.com).*
Lau et al., "Trading of NASDAQ stocks on the Chicago stock exchange", The Journal of Financial Reasearch. vol. XIX, No. 4, pp. 579-584 (Winter 1996).*

* cited by examiner

*Primary Examiner*—Vincent Millin
*Assistant Examiner*—Daniel Felten
(74) *Attorney, Agent, or Firm*—Womble Carlyle

(57) ABSTRACT

A first equity instrument which represents an ownership interest in a portfolio of stocks. The portfolio of stocks is a subset of a larger portfolio of stocks, which also has a corresponding second equity instrument representing an ownership interest in the larger portfolio of stocks. The weight of each stock in the smaller portfolio is substantially similar to its weight in the larger portfolio, divided by the combined weight of the smaller portfolio within the larger portfolio. Thus, trading in the equity instrument allows one to maintain the relative proportions of the stocks belonging to the smaller portfolio, in the larger portfolio without having to trade the individual stocks comprising the smaller portfolio.

22 Claims, 1 Drawing Sheet

200

| 202 S&P500 SPDR member stocks | 204 Weight in S&P500 SPDR | 208 54 NASDAQ-only Member stocks of SPDR | 210 Weight in S&P500 SPDR | 212 Weight in 54 NASDAQ-only SPDR |
|---|---|---|---|---|
| AFL UN | 0.1049 ~206 | AMAT UQ ~214 | 0.5787 | 2.70349 |
| ADP UN | 0.0569 | ADSK UQ | 0.0189 | 0.08829 |
| ACV UN | 0.0109 | BBBY UQ | 0.0451 | 0.21069 |
| ABS UN | 0.1117 | BGEN UQ | 0.0659 | 0.30786 |
| AL UN | 0.0609 | BMET UQ | 0.0324 | 0.15136 |
| . | . | . | . | . |
| . | . | . | . | . |
| . | . | . | . | . |
| . | . | VRTS UQ | 0.3196 | 1.49306 |
| . | . | XLNX UQ | 0.1738 | 0.81193 |
| . | . | YHOO UQ | 0.5293 | 2.47271 |
| . | . | Totals 54 stocks | 21.4057 | 100.00000 |
| WY UN | 0.1052 | | | |
| WHR UN | 0.0376 | | | |
| WLL UN | 0.0347 | | | |
| WMB UN | 0.1361 | | | |
| WIN UN | 0.0221 | | | |
| WOR UN | 0.0088 | | | |
| WWY UN | 0.0723 | | | |
| XRX UN | 0.1358 | | | |
| XLNX UN | 0.1738 | | | |
| YHOO UN | 0.5293 | | | |
| YNR UN | 0.0268 | | | |
| Totals 500 stocks | 99.9831 | | | |

200

| S&P500 SPDR member stocks (202) | Weight in S&P500 SPDR (204) | 54 NASDAQ-only Member stocks of SPDR (208) | Weight in S&P500 SPDR (210) | Weight in 54 NASDAQ-only SPDR (212) |
|---|---|---|---|---|
| AFL UN | 0.1049 (206) | AMAT UQ (214) | 0.5787 | 2.70349 |
| ADP UN | 0.0569 | ADSK UQ | 0.0189 | 0.08829 |
| ACV UN | 0.0109 | BBBY UQ | 0.0451 | 0.21069 |
| ABS UN | 0.1117 | BGEN UQ | 0.0659 | 0.30786 |
| AL UN | 0.0609 | BMET UQ | 0.0324 | 0.15136 |
| . | . | . | . | . |
| . | . | . | . | . |
| . | . | . | . | . |
| . | . | VRTS UQ | 0.3196 | 1.49306 |
| . | . | XLNX UQ | 0.1738 | 0.81193 |
| . | . | YHOO UQ | 0.5293 | 2.47271 |
| . | . | Totals 54 stocks | 21.4057 | 100.00000 |
| . | . | | | |
| WY UN | 0.1052 | | | |
| WHR UN | 0.0376 | | | |
| WLL UN | 0.0347 | | | |
| WMB UN | 0.1361 | | | |
| WIN UN | 0.0221 | | | |
| WOR UN | 0.0088 | | | |
| WWY UN | 0.0723 | | | |
| XRX UN | 0.1358 | | | |
| XLNX UN | 0.1738 | | | |
| YHOO UN | 0.5293 | | | |
| YNR UN | 0.0268 | | | |
| Totals 500 stocks | 99.9831 | | | |

Fig. 1

DERIVATIVE SECURITIES TRADING PRODUCT UTILIZING SUBSETS OF INDICES OR PORTFOLIOS

TECHNICAL FIELD

The present invention is related in general to derivative securities traded in a securities market. It is especially concerned with a new form of equity derivative traded on a stock exchange or other suitable market.

BACKGROUND

On the floor of a stock exchange, such as the New York Stock Exchange (NYSE) or the American Stock Exchange (AMEX), equities are traded by firms which are generally referred to as brokers. Some of these brokers are officially given the exclusive right to maintain the market for one or more particular stocks, and these firms are called specialists, because they specialize in trading those one or more particular stocks. And within that firm, a particular individual serves as the firm's specialist in handling one or more of those stocks for which the firm serves as the specialist. In general, most of the transactions for a particular stock are handled automatically and instantaneously. This is because a single specialist is responsible for handling all the conventional buy and sell orders. However, the privilege of having the exclusive right to trade in a certain stock comes with certain obligations and responsibilities. Chief among these is the obligation to help stabilize the share price of the stock in which that specialist specializes in a volatile market. Thus, if the share price drops precipitously during the course of a day, the specialist is expected to cushion the falling share price by purchasing a significant number of the shares so as to prevent a free fall in the price of that stock. A specialist is typically human, but the specialist role may also be fulfilled by a virtual specialist, as disclosed in U.S. Pat. No. 5,950,176 to Keiser, whose contents are incorporated to the extent necessary to understand the present invention.

Unlike the NYSE and the AMEX, the National Association of Securities Dealers Automated Quotations System (NASDAQ) does not have brokers and specialists, but rather has dealers, each of whom is free to handle trades in any stock. Thus, there is no official exclusivity in trading a particular stock and so each dealer is authorized to conduct transactions between buyers and sellers. Because a sale of a security on the NASDAQ can theoretically be handled by any number of dealers, transactions between buyers and sellers may not take place as rapidly as they do on the NYSE or AMEX. Furthermore, because there is no exclusivity, the dealers on the NASDAQ are in no way obligated to cushion the fall in the price of any given stock, a factor which contributes to wider percentage swings in the share prices of the stocks listed in the NASDAQ.

Mutual funds are an alternative to individual investing and typically pool money from several investors into a single pool. The pool is then invested in at least two, and oftentimes far more, stocks. This diversification spreads the risk over a number of stocks, thereby offering an investor a lower risk of a catastrophic loss in the value of his or her investment portfolio. In general, an investor purchases shares in a mutual fund, and can redeem those shares in accordance with the mutual fund's redemption policy, which most often determines the share price at the end of a trading day. Large redemptions by investors over a short time period force the mutual fund manager to sell shares in the underlying stocks. In the case of closed mutual funds, however, investors typically buy and sell the shares amongst themselves in a securities market.

The composition of a mutual fund can be based on a number of criteria. While some mutual funds reflect the composition of particular well-known indexes, such as the 30 companies comprising the Dow Jones' Industrial Averages or the Standard & Poor's 500 (S&P 500), others are specific to a geographical area (e.g., an "Asia" fund), an industry sector (e.g., "biotechnology"), investment objective type (e.g., "growth"), or have some other characteristic in common. Most mutual fund, regardless of their composition, include stocks traded on more than one exchange.

Indices, index funds and mutual funds comprise a basket of shares from different stocks whose contribution in any given index or fund is weighted. In this context, a 'weight' or 'weighting' refers to the proportion of a component securities' value to the whole, and this can be done in a number of ways. For example, the Dow Jones 30 industrials are "price" weighted and so the Dow Jones average is based on the price of one unit of each component member, divided by a divisor. The S&P 500, on the other hand, is "market cap" weighted and so each member component is represented according to its market capitalization. While "price" and "market cap" weighting are the most commonly used weights, other weightings based on measures of the volatility of the component members or other arbitrarily created criteria, may also be employed.

The manager of an index fund which tries to mimic the market cap weighting of the S&P 500, tries to keep the weighting of the stocks in the index fund to reflect that of the S&P 500. This is typically done by adjusting the number of shares of many, if not all, of the different stocks, perhaps as often as on a day-to-day basis, depending on the fluctuation of the share prices of each. To do this, the fund manager places orders to buy or sell each of the stocks that he wishes to trade. In the case of the stocks listed on the NYSE, the orders are handled by the specialists and each trade is handled automatically and efficiently. However, in the case of stocks listed on the NASDAQ, due to the dealer structure, there may be delays and inefficiencies in executing each of the various trades. For example, if the S&P 500 has 446 stocks from the NYSE and 54 stocks from the NASDAQ, the orders for the 446 stocks may be handled automatically by the corresponding specialists, while the orders for the remaining 54 stocks are handled by various dealers and so the resulting trades may encounter delays and inefficiencies, which may cost the fund dearly, when the stock market is volatile.

Standard & Poor's Depository Receipts (SPDRs, conventionally pronounced 'spiders') are derivative equities traded on the AMEX via specialists. SPDRs allow one to buy or sell an entire portfolio of the underlying stocks in a single transaction. The SPDRs are equity instruments devised to package equity into a single listed security. They represent ownership in a SPDR Trust, a unit investment trust which holds a portfolio of common stocks that tracks the price performance and dividend yield of the S&P 500 Index. A SPDR is like an open end unit trust that is rebalanced daily to the S&P 500 Index and may trade at a premium or discount to the S&P 500 futures. SPDRs may be held like a stock for a long time and entitle the holder to quarterly cash distributions corresponding to the dividends that accrue to the S&P stocks in the underlying portfolio, less expenses. Thus, an SPDR is effectively a share in a trust whose sole purpose is to invest in the selected underlying stocks, the share being traded on the AMEX. Sector SPDRs which focus on categories of stocks have been formed, and these include such categories as Basic Industries, Consumer Services, Consumer Staples, Cyclical/Transportation, Energy, Finance, Industrial, Technology and Utilities. In addition, mid-cap SPDRs which mirror the composition of the S&P-400 Midcap funds have also been formed. Unlike traditional index mutual funds that are purchased and redeemed only at end-of-day closing prices, SPDRs trade at real-time prices throughout the trading day. Therefore, an SPDR representing the S&P 500 allows one to get in and out of the S&P 500 whenever one wants, both easily and conveniently. Furthermore, since SPDRs are traded just like stocks, they provide quarterly dividends, can be bought on margin, sold short, and so forth, and options in the SPDRs can also be traded.

In a volatile trading day, share prices of a particular stock may change drastically and a large number of buy and sell orders may hit the floor. On the NYSE or the AMEX, the volume of such orders does not pose a major problem since a single specialist handled the trades. However, handling such orders on the NASDAQ is somewhat more problematic, because of the large number of dealers who can potentially handle transactions in a particular stock. To offset the risks associated with volatility in the share price of a particular stock, a specialist in that stock may trade in the stock for the benefit of his or her firms' own portfolio. In the case of an SPDR, the SPDR specialist can buy and sell the underlying basket of equities comprising that SPDR. In the case of an SPDR which is based on the S&P 500 or other index which includes stocks found both on the NYSE and the NASDAQ, the SDR specialist must quickly buy and sell shares in both markets. For reasons stated above, while the trades on the NYSE are done quickly and efficiently through automatic execution orders done though specialists, the trades on the NASDAQ may not take place so fast, due to the multiple dealers involved.

SUMMARY OF THE INVENTION

In one aspect, the present invention is directed to one or more smaller portfolios ("child portfolio") of different securities which are subsets of a larger portfolio ("parent portfolio"), with the weighting of each of the different securities in the smaller portfolio being substantially similar to their weighting in the larger portfolio, divided by the combined weighting of the smaller portfolio within the parent portfolio.

In one aspect, the parent portfolio comprises a basket of different securities which normally are traded in two or more securities markets, while at least one child portfolio comprises only those securities traded in one of the two or more securities markets.

In yet another aspect, the parent portfolio is partitioned into a plurality of non-overlapping children portfolios.

In yet another aspect, the component securities in the parent portfolio are distributed over a plurality of overlapping children portfolios.

In yet another aspect, the present invention is directed to a securities market in which both the first and second portfolios are traded.

BRIEF DESCRIPTION OF THE DRAWINGS

The present invention is more readily understood from the following detailed description of the preferred embodiments, the claims and with reference to the appended drawings, in which:

FIG. 1 depicts the contents of a parent and a child portfolio in accordance with a first embodiment of the present invention.

DETAILED DESCRIPTION OF THE PREFERRED EMBODIMENT

For the purposes of this discussion, the term "security" is meant to include any note, stock, treasury stock, bond, debenture, certificate of interest or participation in any profit-sharing agreement or in any oil, gas, or other mineral royalty or lease, any collateral-trust certificate, preorganization certificate or subscription, transferable share, investment contract, voting-trust certificate, certificate of deposit for a security, any put, call, straddle, option, or privilege on any security, certificate of deposit, or group or index of securities (including any interest therein or based on the value thereof), or any put, call, straddle, option, or privilege entered into on a market relating to foreign currency, or in general, any instrument commonly known as a "security"; or any certificate of interest or participation in, temporary or interim certificate for, receipt for, or warrant or right to subscribe to or purchase, any of the foregoing.

For the purposes of this discussion, the term "securities market" is meant to include any market place or facilities for bringing together purchasers and sellers of securities or for otherwise performing with respect to securities the functions commonly performed by a securities market as that term is generally understood, and includes the market place itself and the market facilities maintained to support the market place.

In the following discussion, reference is made to a parent portfolio P and a parent financial instrument $P_{eq}$. The parent portfolio P comprises a basket of an integer number N of different securities $s_1, s_2, \ldots, S_N$. Each of the different securities $s_i$ is traded in a securities market, and all securities need not be traded on the same securities market. The weighting of the different securities in the parent portfolio is represented by $P(s_i)$, where P(si) represents the weight of parent portfolio P that is accounted for by security $s_i$. The financial instrument $P_{eq}$ represents a share in the parent portfolio P and is itself traded in a securities market.

In the following discussion, reference is also made to a child portfolio $C_j$ and a child financial instrument $C_{eqj}$. A child portfolio $C_j$ comprises a basket of an integer number $M_j$, $M_j<N$, of different securities from among those securities in parent portfolio P. In other words, the different securities in child portfolio $C_j$ are a subset of the different securities in the parent portfolio P, the index j simply representing the ordinal number of the child portfolio, since a parent portfolio P can have a total of some integer number J child portfolios $G_j$, j=1, . . . , J, each having $M_j$ securities. The weightings of the different securities in a child portfolio $C_j$ is represented by $C_j(s_i)$, where $C_j(s_i)$ represents the weight within the child portfolio $C_j$ that is accounted for by security $s_i$ of the original parent portfolio. It should be kept in mind, however, that not all the original $s_i$ are represented in the child portfolio and, in general, only a small proportion of the original N $s_i$ are represented in any given child portfolio $C_j$. The weightings of the different securities in a child portfolio is related to their weights in the parent portfolio. Specifically, if child portfolio $C_j$ accounts for X% of the total weight of parent portfolio P, then $Cj(s_i)=(100/X)*P(s_i)$. The child financial instrument $C_{eqj}$ represents a share in the child portfolio $C_j$, and $C_{eqj}$ itself is traded in a securities market, which may or may not be the same securities market in which the parent financial instrument $P_{eq}$ is traded.

Embodiments of the present invention are described with the parent and child portfolios comprising baskets of stocks, and the parent and child financial instruments represented by parent and child equities that are traded in one or more stock markets. It should be kept in mind, however, that the invention applies to securities in general, and not just to stocks and stock markets.

FIG. 1 presents a chart 200 representing portions of a parent and a child portfolio in accordance with a first embodiment of the present invention. Column 202 of chart 200 lists the coded symbols for an index fund comprising a basket of N=500 different stocks, of which only the first few and the last few, alphabetically speaking, are shown. Each of the 500 stocks is normally listed in one of two or more exchanges or markets. In the case of chart 200, the 500 stocks are all members of the S&P 500 (the parent portfolio P) and are normally traded in either the NYSE ("UN") or the NASDAQ ("UQ"). In a preferred embodiment, the index fund is the S&P 500-based SPDR and so chart 200 represents information about the different stocks in that SPDR, which is traded on the AMEX. It should be kept in mind, however, that the present invention is also applicable to Sector SPDRs, Midcap SPDRs and, in general, to any index fund that is traded on a market and includes different stocks normally listed on more than one market (e.g., some stocks being sold in the NASDAQ while others are sold in the NYSE). Column 204 of chart 200 presents information on the weights 206 of each of the stocks in the S&P 500-based SPDR (the $P(s_i)$). In a volatile market, the specialist on the AMEX who handles the SPDR may try to cushion the price of the SPDR by buying and selling the underlying stocks which are in the NYSE or the AMEX. However, with respect to the stocks normally traded on the NASDAQ, this may not be handled either quickly or efficiently.

To address the problem with quick and efficient trading of those SPDR stocks normally traded on the NASDAQ, the present invention contemplates the creation of a new financial instrument which represent shares in a new portfolio, called the SPDRX (a child portfolio $C_i$). The SPDRX is represented by the 54 stocks in column 210 (of which only the first few and last few, alphabetically speaking, are shown). The SPDRX preferably is also traded on the AMEX, just like the SPDR, although this is not an absolute requirement. Furthermore, an SPDRX-specialist preferably is provided, and this specialist handles trades in the shares of the SPDRX. Finally, the SPDQ preferably is also a unit investment trust and is derived from the S&P 500-based SPDR.

The SPDRX comprises a basket of 54 stocks which form a subset of the stocks in the SPDR and, in particular, specifically comprises those stocks in the SPDR normally sold on the NASDAQ. The weight ($C_i(s_i)$) of each member of the SPDRX is based on its corresponding weight in the SPDR divided by the fraction of the SPDR for which the NASDAQ-only shares are responsible. Thus, if the weights of the NASDAQ shares in the SPDR collectively represent X=21.4057% of the total weight (nominally 100%) in the SPDR, and a particular NASDAQ stock represents 3% of that total weight in the SPDR, its weight in the SPDRX would be (100/21.4057)3%=14.01495% of the SPDRX.

Column 210 shows the weight of each of the SPDRX stocks in the original SPDR, and column 212 shows the weights of the different stocks in the SPDRX, relative to the other stocks in the SPDRX. Since the NASDAQ-only stocks account for 21.4057% of the parent SPDR fund with SPDRX component member AMAT UQ 214 comprising 0.5787% of the SPDR, AMAT UQ 214 comprises (100/21.4057)(0.5787)=2.70349% of the SPDRX (as shown in column 212). Thus, AMAT UQ is in proportion relative to the other components of the SPDRX, as they were in the SPDR. While in the above example, the parent portfolio had a particular existing equity, i.e., the S&P 500-based SPDR, it should be noted that child portfolios could similarly be created from other index funds as well. Furthermore, the present invention also contemplates creating both parent and child portfolios and their corresponding parent and child equities, or, for that matter, parent and child securities of other types.

In the above-described preferred embodiment, there is a single child portfolio (the SPDRX) which comprises all the stocks traded in a single market (in this case, the NASDAQ). And among a total of N=500 different securities in the parent portfolio (i.e., the S&P 500-based SPDR), $M_1$=54 different securities of the child portfolio all are traded on a first securities market (the NASDAQ), while none of the other N−$M_1$=446 different securities in the parent portfolio are traded on that first securities market. The benefits of the SPDRX of this first embodiment now become evident. Instead of placing $M_1$=54 separate orders with NASDAQ dealers to trade the orders, an SPDR specialist need only place a single order to buy or sell shares of $C_{eq1}$ with the SPDRX specialist. Since the SPDRX shares are traded automatically, this means that the SPDR specialist realizes the benefits of speed and efficiency previously accorded only for those remaining 446 stocks not individually traded on the NASDAQ.

In the foregoing embodiment, the S&P 500-based SPDR was used as the parent portfolio and its NASDAQ-only component as the sole child portfolio. It should be kept in mind, however, that many child portfolio subsets of a parent portfolio maybe formed without using all the components in the parent portfolio. Thus, for example, one could form a total of two child portfolios—one for the NASDAQ-only component and another for, say, the NYSE stocks whose 90-day average trade volume is in the bottom 20% (thus indicating that they may be harder to trade). In such case, the two child portfolios would (a) not have overlapping components; (b) not account for all the components in the parent portfolio, and (c) each comprise a basket of different stocks, each of which has a weight that is in line with its weight in the parent portfolio relative to the other stocks in the same child portfolio. One skilled in the art will recognize that there are countless ways to form non-overlapping child portfolios which do not include all the components of the parent portfolio. Furthermore, these child portfolios can be based on a whole host of criteria other than those given above.

In another embodiment of the present invention, the parent portfolio P which comprises N different stocks is partitioned into an integer number J non-overlapping child portfolios, $C_j$, j=1, 2, . . . , J, each child portfolio $C_j$ representing a basket of $M_j$ different stocks, with the sum of all the $M_j$ totaling N. Such a partition may be based on any number of criteria. For example, the parent portfolio P can be partitioned based on size—the stocks having the largest N/3 weights, the middle N/3 weights and the smallest N/3 weights (and so J=3). Alternatively, the parent portfolio may be partitioned into J child portfolios, each of which represents a particular sector of the economy, with any stocks not neatly fitting into any one sector lumped into a 'miscellaneous' child portfolio. Yet another alternative is to partition them based on volatility-related factors such as price fluctuation or turnover, based on some time period, such as a 90-day average. An example of this would be to partition the stocks into 5 groupings representing the bottom 20% in turnover, the next 20% in turnover, and so forth. In each case, however, the weightings of the stocks within a child portfolio would mirror what is found in the parent portfolio relative to the other stocks in that child portfolio. Again, one skilled in the art would readily find that there are numerous bases for partitioning the parent portfolio and countless ways in which one could partition N stocks into J child portfolios, for sizeable numbers of N and even only modest numbers of J.

In yet another embodiment of the present invention, one may instead create multiple overlapping child portfolios $C_j$ from a parent portfolio P. Again, the weightings of each stock in a child portfolio would mirror its weighting in the parent portfolio, relative to the other stocks in the child portfolios to which that stock belongs. Overlapping child portfolios make sense in a number of contexts. One example is a first child portfolio $C_1$ comprising only the computer stocks in the parent portfolio and a second child portfolio $C_2$ comprising all the 'value' stocks in the parent portfolio. On some days, the computer stocks might be extremely volatile, and so it would be expedient to adjust one's position in their computer holdings, while on other days, the 'value' stocks (which may include computer stocks) might be extremely volatile, and so one might want to change their position in those stocks, instead. Since the weighting of each of the stocks in the child portfolio reflects the relative exposure in the parent portfolio, one can effectively maintain the relative holdings of those stocks in an overall investment strategy using just a few number of trades.

The hardware infrastructure, including the securities marketplace, to implement the present invention is already in the hands of the customers, investment banks, brokers, dealers, specialists, markets, and others, and so are not repeated here. Furthermore, one skilled in the art will also recognize that the logistics of establishing, issuing, listing and trading a new type of equity on a stock exchange is well understood. Therefore, it is believed that the underlying systems and procedures disclosed in U.S. Pat. No. 5,983,204, U.S. Pat. No. 5,950,176, U.S. Pat. No. 5,946,667, U.S. Pat. No. 5,806,048, all of whose contents are incorporated by reference to the extent necessary to understand the present invention, may be relevant to one or more facets of deploying the present invention. It is also well understood that an investor may contact another party, such as a broker, a dealer or a specialist, either in person or via some communications device, such as a telephone, computer or the like, to place an order to buy or sell a financial instrument established in accordance with the present invention. The party receive the order will ultimately see to it that the appropriate trade is executed, using a known manner of trading, either themselves or using intermediaries, and either in person, or via another communications device, also well known in the art.

As is known to those skilled in the art, establishing a child equity (or both a parent and child equity) to be traded on a national stock exchange takes a number of steps. After formulating the idea for the child equity, one would seek SEC approval, pick a stock exchange on which the child equity is to be listed, and seek approval from the chosen stock exchange. If the child equity were to be established as an unit investment trust, such as an SPDR, then the formalities for creating the trust would also have to be attended to during this process.

Issuance of the child equity is preferably done under the auspices of a national investment bank or brokerage house having the means to fund and create a child portfolio and its associated child equity. A prospectus, or the like, may be required prior to issuance of any shares in the child equity. Once the child equity is listed on the chosen stock exchange, it is then traded, owned, and redeemed as any other equity on that exchange. Preferably, the child equity is traded through a specialist, and most preferably this is done on either the NYSE or the AMEX. The specialist, or other trader will receive offers to buy and offers to sell the child equity, and will match one with the other. Alternatively, the specialist may buy and sell the child equity for their own inventory. It is understood that a child equity in accordance with the present invention will have a unit price established in the marketplace through asking price, bids and actual trades, among others.

The child equity is thus an equity instrument which has a share price on the exchange on which it is traded. The equity instrument represents an ownership interest in the child portfolio, the child portfolio comprising shares of an integer number M different stocks selected from the parent portfolio, the parent portfolio itself comprising shares of an integer number N different stocks, N>M, with the weight of each stock in the child portfolio being substantially similar to its corresponding weight, divided by the combined weight of the child portfolio within the parent portfolio.

Proof of ownership in the financial instrument of the present invention can take one of many forms. For instance, the financial instrument maybe in the form of printed certificates held by the investor, printed certificates held in 'street' name by another in trust for the investor, in the form of an electronic record, preferably one that is digitally signed by a cognizant authority, or in any other form normally used in the securities industry. Regardless of how ownership is manifested, the financial instrument represents an ownership interest in a child portfolio comprising a subset of the different securities found in a parent portfolio, the weight of each of the stocks in the child portfolio being the same relative to each other, as in the parent portfolio.

While the above invention has been described with reference to certain preferred embodiments and demonstrated with respect to particular experiments, it should be kept in mind that the scope of the present invention is not limited to these. Thus, one skilled in the art may find variations of these preferred embodiments which, nevertheless, fall within the spirit of the present invention, whose scope is defined by the claims set forth below.

What is claimed is:

1. A first financial instrument representing an ownership interest in a first portfolio, the first portfolio comprising units of an integer number M different securities selected from a second portfolio, the second portfolio comprising units of an integer number N different securities, N>M, with the M different securities being a subset of the N different securities, wherein the weight of each security in the first portfolio is similar to that security's corresponding weight in the second portfolio, divided by the combined weight of the first portfolio within the second portfolio, where all the first financial instrument, and a second financial instrument representing an ownership interest in the second portfolio, are traded on a securities market, and wherein all of said M different securities in the first portfolio are traded on a first securities market, and none of the other N−M different securities arc traded on said first securities market.

2. The first financial instrument according to claim 1, wherein the first and second financial instruments are both traded on the same securities market.

3. The first financial instrument according to claim 2, wherein the first and second financial instruments are both traded on the American Stock Exchange (AMEX).

4. A first financial instrument representing an ownership interest in a first portfolio, the first portfolio comprising units of an integer number M different securities selected from a second portfolio, the second portfolio comprising units of an integer number N different securities, N>M, with the M different securities being a subset of the N different securities, wherein the weight of each security in the first portfolio is similar to that security's corresponding weight in the second portfolio, divided by the combined weight of the first portfolio within the second portfolio, wherein the first financial instrument, and a second financial instrument representing an ownership interest in the second portfolio, are traded on a securities market, and wherein the M different securities in the first portfolio are all traded on the National Association of Securities Dealers Automated Quotations System (NASDAQ) and none of the N−M other securities in the second portfolio is traded on the NASDAQ.

5. The first financial instrument according to claim 4, wherein the second portfolio comprises stocks belonging to the Standard & Poor's 500 (S&P 500) and the first portfolio comprises only all of the stocks in the S&P 500 that are traded on the NASDAQ.

6. A first financial instrument representing an ownership interest in a first portfolio the first portfolio comprising units of an integer number M different securities selected from a second portfolio, the second portfolio comprising units of an integer number N different securities N>M, with the M different securities being a subset of the N different securities, wherein the weight of each security in the first portfolio is similar to that security's corresponding weight in the second portfolio, divided by the combined weight of the fast portfolio within the second portfolio, wherein the first financial instrument and a second financial instrument representing an ownership interest in the second portfolio are traded on a securities market, and wherein the M different securities in the first portfolio have the M lowest average trading volumes among the N different securities during a previous time period.

7. A first financial instrument representing an ownership interest in a first portfolio, the first portfolio comprising units of an integer number M different securities selected from a second portfolio second portfolio comprising units of an integer number N different securities N>M with the M different securities being a subset of the N different securities, wherein the weight of each security in the fast portfolio is similar to that security's corresponding weight in the second portfolio divided by the combined weight of the first portfolio within the second portfolio, wherein the first financial instrument, and a second financial instrument representing an ownership interest in the second portfolio are traded on a securities market, and wherein the M different securities in the fast portfolio have the M highest price fluctuations among the N different securities during a previous time period.

8. A plurality of first financial instruments $C_{10q}$, $C_{20q}$, $C_{jeq}$, J>1, each representing an ownership interest in a corresponding one of a first set of 1 portfolios $\{C_2, \ldots C_j\}$, each member of said first set of portfolios comprising units of a corresponding integer number M different securities selected from a second portfolio, the second portfolio comprising units of an integer number N different securities, N>M, with the M different securities being a subset of the N different securities for all j, wherein the weight of each security in any one $C_j$ is similar to that security's corresponding weight in the second portfolio, divided by the combined weight of $C_j$ within the second portfolio, each of the first financial instruments, and a second financial instrument representing an ownership interest in the second portfolio, are traded on a securities market, and all of said M different securities in at least one of the J portfolios are traded on a first securities market, and none of the other N−M different securities are traded on said first securities market.

9. The plurality of first financial instruments according to claim 8, wherein the set of first portfolios have no securities in common.

10. The plurality of first financial instruments according to claim 9, wherein the set of first portfolios form a partition of the second portfolio such that all N securities in the second portfolio are distributed among the set of J first portfolios.

11. The plurality of first financial instruments according to claim 8, wherein at least two members of the set of first portfolios have securities in common.

12. The plurality of first financial instruments according to claim 11, wherein all N securities in the second portfolio are represented in at least one member of the set of first portfolios.

13. A method of facilitating an exchange in ownership of a security, the method comprising:

a step of providing a first financial instrument representing an ownership interest in a first portfolio, the first portfolio comprising units of an integer number M different securities selected from a second portfolio, the second portfolio comprising units of an integer number N different securities, N>M, with the M different securities being a subset of the N different securities, where the weight of each security in the first portfolio is similar to that security's corresponding weight in the second portfolio, divided by the combined weight of the first portfolio within the second portfolio, where all the first financial instrument, and a second financial instrument representing an ownership interest in the second portfolio, are traded on a securities market, and wherein all of said M different securities in the first portfolio are traded on a first securities market, and one of the other N−M different securities are traded on said first securities market;

a step of receiving a first offer to sell said first financial instrument;

a step of receiving a second offer to buy said first financial instrument; and matching said first and second offers.

14. A first financial instrument representing an ownership interest in a first portfolio comprising an integer number M different stocks traded on the National Association of Securities Dealers Automated Quotations System (NASDAQ), wherein:

the M different stocks are included in an index based on market capitalization values of an integer number N different stocks, N>M, with the M different stocks being a subset of the N different stocks and at least some of the N different stocks not being traded on the NASDAQ; and the market capitalization weight of each of the M different stocks in the first portfolio is similar to that stock's corresponding market capitalization weight in the index, divided by the combined market capitalization weight of the first portfolio within the index.

15. The first financial instrument according to claim 14, wherein the index is the Standard & Poor's 500 (S&P 500).

16. The first financial instrument according to claim 14, wherein the index is the Standard & Poor's 100 (S&P 100).

17. The first financial instrument according to claim 14, wherein at least some of the N different stocks are traded on the New York Stock Exchange.

18. The first financial instrument according to claim 14, wherein N–M of the N different stocks are traded on the New York Stock Exchange.

19. The first financial instrument according to claim 18, wherein the index is the Standard & Poor's 500 (S&P 500).

20. The first financial instrument according to claim 18, wherein the index is the Standard & Poor's 100 (S&P 100).

21. A first financial instrument representing an ownership interest in a first portfolio comprising stocks in the National Association of Securities Dealers Automated Quotations System (NASDAQ)-only component of the Standard & Poor's 500 (S&P 500), wherein the market capitalization weight of each of the individual NASDAQ stocks in the first portfolio is similar to that stock's corresponding market capitalization weight in the S&P 500, divided by the combined market capitalization weight of the first portfolio within the S&P 500.

22. A first financial instrument representing an ownership interest in a first portfolio comprising stocks in the National Association of Securities Dealers Automated Quotations System (NASDAQ)-only component of the Standard & Poor's 100 (S&P 100), wherein the market capitalization weight of each of the individual NASDAQ stocks in the first portfolio is similar to that stock's corresponding market capitalization weight in the S&P 100, divided by the combined market capitalization weight of the first portfolio within the S&P 100.

* * * * *